Aug. 6, 1940.  J. T. MIDYETTE, JR  2,210,122
CONTROL SYSTEM
Filed May 24, 1935
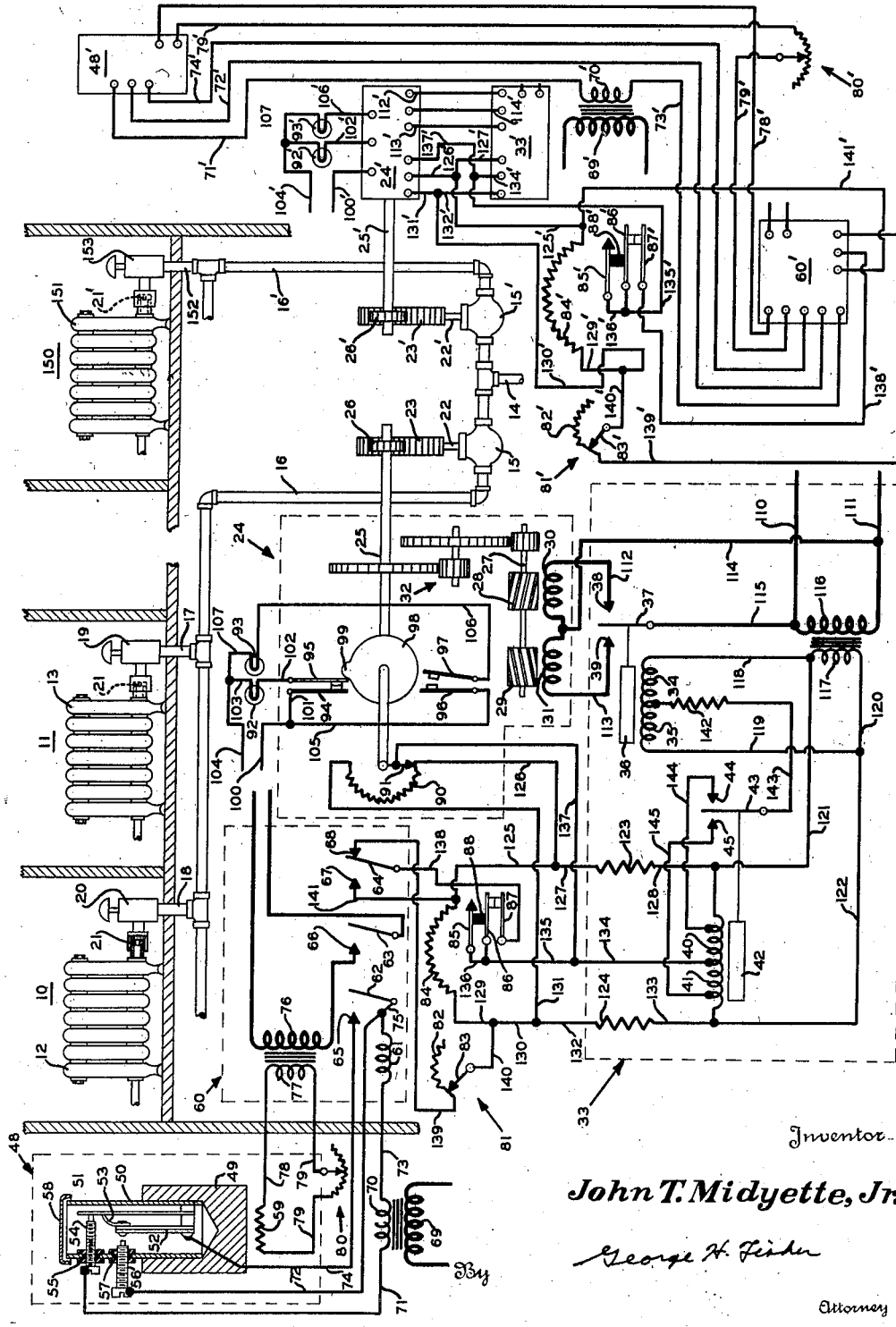
Inventor
John T. Midyette, Jr.
By George H. Fisher
Attorney Patented Aug. 6, 1940

2,210,122

UNITED STATES PATENT OFFICE 2,210,122

CONTROL SYSTEM

John T. Midyette, Jr., Scarsdale, N. Y., assignor to Minneapolis-Honeywell Regulator Company, Minneapolis, Minn., a corporation of Delaware Application May 24, 1935, Serial No. 23,223

16 Claims. (Cl. 236—91)

The present invention relates to temperature control systems, and particularly heating systems, wherein the flow of temperature changing fluid to a plurality of rooms or spaces or to a plurality of heat exchangers located in or associated with a plurality of rooms or spaces is controlled by a single element that is in turn controlled by a device which responds to a condition that is representative of the demand for an average change of condition in the various rooms or spaces.

One of the objects of the present invention is the provision of a temperature control system for a plurality of spaces in which a single flow controlling element or valve controls the flow of temperature changing fluid to all of the spaces or to temperature changers associated with all of the spaces, the arrangement being such that this flow controlling element or valve is normally operated either to its full open or maximum flow position or to its full closed or no-flow position in response to changes in the average demand of all the spaces, together with means for varying the range of movement of the valve or flow controlling element.

In the specific form of the invention to be hereinafter set forth in detail, a single valve controls the flow of steam to a plurality of radiators located in a corresponding number of rooms. This valve is normally either moved to full open position or to full closed position by a suitable automatic control. This controller preferably takes the form of a device which is located outside of the building to be controlled and in such a manner that it is subjected to the same atmospheric conditions, such as outdoor temperature, wind velocity and direction, and solar radiation, the control device being equipped with a heater and a thermostat which operates the heater in such a manner as to maintain a desired temperature condition in the controller. This thermostat also controls the steam valve and desired temperature conditions are maintained in the various spaces since the heat losses therefrom, or the average heat loss therefrom, bears a direct relation to the heat loss from the controller. Manual means are further provided to prevent complete closing of the steam valve so that a minimum flow of steam may be maintained at all times and particularly during colder weather so that the various radiators will continuously receive a small amount of heat.

A further object of this invention is the provision of a novel electrical control system for a valve or the like, which is so arranged that the valve is normally moved to either full open position or full closed position under the control of a pair of switches, provision being made to prevent complete closing of the valve by the valve closing switch if it is desired to maintain the valve partially open to permit a small flow of fluid therethrough irrespective of the condition or position of the controlling switches.

A further object of the invention comprises the provision of systems of the nature set out above which are provided with means to permit the positioning of the valve or flow controlling element in any desired position entirely irrespective of the condition of the controller.

Other objects of the invention lie in the various sub-combinations and detailed wiring arrangements that will be found in the drawing, the detailed description and the appended claims.

For a more complete understanding of the invention, reference may be had to the following detailed description and the accompanying single drawing which is a diagrammatic showing of one form of the invention as applied to the heating of a large building.

Referring to the drawing, two rooms of one section of a large building are indicated at 10 and 11. The room 10 is provided with a radiator 12 and the room 11 is provided with a radiator 13. It will be understood that any type of heat exchanger could be utilized for changing the temperature in rooms 10 and 11 and the radiators 12 and 13 shown herein are representative of heat exchangers in general for either cooling or heating purposes.

Any suitable source of temperature changing fluid may be utilized in the heat exchangers 12 and 13 and in the present system this source of fluid is diagrammatically shown as a steam pipe 14 which may receive steam from a central power station or the like. The pipe 14 is connected to a valve 15 which is in turn connected to a riser 16 that supplies steam to the radiators 13 and 12 through pipes 17 and 18. The pipe 17 is shown provided with a hand operated valve 19 and the pipe 18 is similarly shown as provided with a hand operated valve 20 by means of which the supply of steam to either or both of these radiators may be discontinued at will by manual manipulation. Also, each of the radiators is preferably provided with a limiting orifice which limits the maximum flow of steam to the radiators, one of these orifices being indicated at 21 in connection with the radiator 12, a similar orifice being indicated in dotted lines for radiator 11.

The valve 15 is provided with a steam 22 to which is secured a rack 23 by means of which the valve 15 may be opened and closed. This rack 23 is controlled by a motor mechanism generally indicated at 24. This motor mechanism 24 includes a main operating shaft 25 to which is secured a pinion 26 that cooperates with the rack 23 of the valve 15. This main operating shaft 25 is operated by a reversible motor means herein shown as comprising two induction motors having their rotors secured to a common rotor shaft 27. The rotors 28 and 29 of these induction motors are secured to the rotor shaft 27 and have associated therewith cooperating field windings 30 and 31. The rotor shaft 27 is connected to the main operating shaft 25 through suitable reduction gearing generally indicated at 32. It will be apparent that upon rotation of the main operating shaft in a clockwise direction when viewed from the left, the rack 23 will be moved upwardly so as to open the valve 15, and that upon counterclockwise rotation of this main operating shaft 25, the rack 23 will be moved downwardly so as to close the valve 15. With the parts in the position shown, the valve 15 is completely closed.

The motor mechanism 24 is controlled by, and in turn cooperates with, a relay mechanism generally indicated at 33. This relay mechanism 33 includes a relay having a pair of relay windings 34 and 35 which cooperate in the control of a single plunger 36. These relay windings 34 and 35 may be entirely separate and distinct or may be formed by providing a single winding with a center tap. The plunger 36 controls a relay switch arm 37 that is disposed between a pair of contacts 38 and 39 and is adapted respectively to engage these contacts 38 and 39 upon one or the other of relay windings 34 and 35 being more highly energized than the remaining winding.

This relay is in turn controlled by a balanced solenoid mechanism which includes a pair of oppositely acting and normally equally energized solenoid windings 40 and 41 which cooperate in the control of a single plunger 42. This single plunger is connected to a switch arm 43 which is disposed between a pair of cooperating contacts 44 and 45. The arrangement is such that if the solenoid coil 40 becomes sufficiently more highly energized than the solenoid coil 41, the plunger 42 moves to the right and brings switch arm 43 into engagement with contact 44. On the other hand, if the solenoid coil 41 becomes sufficiently more highly energized than the solenoid coil 40, the plunger 42 moves to the left and brings switch arm 43 into engagement with contact 45.

The unbalancing of the energizations of the solenoid coils 40 and 41 is primarily controlled by a condition responsive controller which suitably responds to the demands of the rooms or spaces 10 and 11 or the average demands thereof. In the particular embodiment of the invention herein disclosed, this controller is generally shown at 48, and comprises an apparatus in the nature of a small building or control housing that is exposed to the same atmospheric conditions as the building of which the rooms or spaces 10 and 11 are a part. This controller 48 includes a block 49 of metallic material or the like whereby the device is given sufficient mass so that the heat losses therefrom are reasonably proportionate to or correlated with the heat losses from the building of which the rooms 10 and 11 are a part. This metallic block 49 is provided with an opening which receives a casing 50. Mounted within this casing 50, and electrically interconnected to each other, are a contact strip 51 and a bimetallic element 52. The bimetallic element 52 is provided with a finger 53 which is adapted to engage the contact strip 51 under certain conditions as will hereinafter become apparent. A contact screw 54 is supported by the casing 50 through the medium of an insulating washer or sleeve 55 and cooperates with the contact strip 51. Similarly, a contact screw 56 is supported by the casing 50 through the medium of a washer or insulating sleeve 57 and cooperates with the bimetallic element 52. The arrangement is such that when the temperature to which bimetallic element 52 responds falls to some predetermined degree such as 70° F., the bimetallic element 52 has moved to the left sufficiently to permit contact strip 51 to move into engagement with the contact screw 54. Upon further temperature drop to some value such as 68° F., the bimetallic element 52 has moved sufficiently further to the left as to engage the contact screw 56. On temperature rise, the bimetallic element 52 first disengages the contact screw 56 and thereafter the finger 53 engages the contact strip 51 and moves the same from engagement with the contact screw 54. The casing 50 is provided with a suitable cover 58. An electrical heater 59 is associated with the block 49 for heating the same and this whole apparatus is enclosed by a suitable casing or cover, not shown.

The thermostat comprised by the bimetallic element 52, the contact strip 51 and the associated contact screws 56 and 54 controls the electrical heater 59 and also controls the unbalancing of the energization of the solenoid windings 40 and 41, indirctly, through a relay mechanism 60. This relay mechanism includes a relay coil 61 which controls switch arms 62, 63 and 64. Upon energization of relay coil 61, switch arms 62 and 63 are respectively moved into engagement with cooperating contacts 65 and 66. Also, upon energization of relay coil 61, switch arm 64 is moved into engagement with a cooperating contact 67. Switch arm 64 moves into engagement with a cooperating contact 68 whenever the relay coil 61 is deenergized. Energization of the relay coil 61 is controlled by the controller 48 and power for the relay coil 61 is supplied by a transformer having a high voltage primary 69 and a low voltage secondary 70.

With the parts in the position shown, the temperature to which bimetallic element 52 responds is substantially 70° F. If this temperature should now fall to 68° F. so that the bimetallic strip 52 moves into engagement with the contact screw 56 as well as the contact strip 51 being in engagement with the contact screw 54, relay coil 61 is energized by the following circuit: Secondary 70, wire 71, contact screw 54, contact strip 51, bimetallic element 52, contact screw 56, wire 72, relay coil 61 and wire 73 to the other side of secondary 70. Energization of relay coil 61 moves switch arms 62, 63 and 64 into engagement with the respective contacts 65, 66 and 67 and moves switch arm 64 from engagement with contact 68. Engagement of switch arm 62 with contact 65 establishes a holding circuit for relay coil 61 which is independent of the bimetallic element 52 and the contact screw 56. This holding circuit is as follows: Secondary 70, wire 71, contact screw 54, contact strip 51, wire 74, contact 65, switch arm 62, wire 75, relay coil 61 and wire 73 to the other side of secondary 70. Relay coil 61 will therefore remain energized until the temperature has risen sufficiently not only to disengage bimetallic element 52 from contact screw 56 but also to disengage contact strip 51 from contact screw 54. Engagement of switch arm 63 with contact 66 completes an energizing circuit to the primary 76 of a step-down transformer as will be evident from an inspection of the drawing. Associated with the primary 76 is a low voltage secondary 77 which is connected to the heater 59 by means of wires 78 and 79, through a manually operable resistance of rheostat 80. The switch arm 64 and the cooperating contacts 67 and 68 control the unbalancing of the energization of solenoid coils 40 and 41 in a manner which will be explained hereinafter.

From this description of the controller 48 and the associated parts, it will be seen that whenever the temperature falls to 68° F., the relay coil 61 is energized which in turn energizes a suitable transformer that causes power to be supplied to the heater 59. When this heat has raised the temperature to which bimetallic element 52 responds to or above 70° F. so that contact strip 51 disengages contact screw 54, then the relay coil 61 will be deenergized so that further heating of the bimetallic element 52 will cease. In this manner, the bimetallic element 52 responds to the temperature maintained within the controller 48 and operates to maintain the temperature thereof between 68° F. and 70° F. Inasmuch as the mass of the block 49 is so selected and the other parts of the controller 48 are so arranged, together with the adjustment provided by rheostat 80, that the heat loss therefrom is comparable to the heat loss from the building in which the rooms or spaces 10 and 11 are located, it will be apparent that this same thermostatic element 52 can also be utilized as a measure of the demand for heat by the rooms or spaces 10 and 11.

The effect of closure of the switch arm 64 and contact 68 may be manually modified by a manually operated rheostat, generally indicated at 81, which comprises a resistance 82 and a manually operable cooperating contact arm 83.

The unbalancing of the energizations of the solenoid coils 40 and 41 is also adapted to be manually controlled by means of a manually controlled potentiometer which comprises a resistance 84 and cooperating contact arm 85. This contact arm 85 is manually operable and also serves to operate a switch by which the apparatus is selectively placed on manual operation or on automatic operation. This switch comprises contact arms 86 and 87 which are adapted to be moved to circuit closed position by an insulated abutment 88, which is secured to the manually operable contact arm 85, when such arm has been moved to a position in which it is out of engagement with the resistance 84, the part being shown in such automatic operation position.

In order to rebalance the energizations of solenoid coils 40 and 41, the main operating shaft 25 of the motor mechanism 24 operates a balancing potentiometer. This balancing potentiometer includes balancing resistance 90 and a cooperating balancing contact finger 91 that is driven by the main operating shaft 25. The function of this balancing potentiometer is to rebalance the energization of the solenoid coils 40 and 41 irrespective of the manner in which or the extent to which their energizations are unbalanced.

In order to indicate whether the valve 15 is closed or opened, a pair of signal lights 92 and 93 are provided. The signal light 92, when energized, indicates that the valve is fully closed and this signal light is controlled by a switch comprising a stationary switch arm 94 and movable or flexible switch arm 95. Similarly, the signal light 93 indicates that the valve is completely open, when the same is energized, and this signal light is controlled by a similar switching mechanism which comprises a stationary switch arm 96 and a movable or flexible cooperating switch arm 97. Movement of the two movable or flexible switch arms 95 and 97 is controlled by a cam 98 that is mounted on the main operating shaft 25. The arrangement is such that when the valve is closed, as shown in the drawing, a projection 99 on the cam 98 engages the switch arm 95 and moves the same into engagement with the switch arm 94 whereupon signal light 92 is energized as follows: Line wire 100, wire 101, switch arm 94, switch arm 95, wire 102, signal light 92, and wire 103 to line wire 104. Similarly, when the main operating shaft 25 has rotated to valve open position, the projection 99 of the cam 98 engages the switch arm 97 and moves the same into engagement with the switch arm 96 whereupon the signal light 93 is energized as follows: Line wire 100, wire 105, switch arm 96, switch arm 97, wire 106, signal light 93 and wire 107 to line wire 104.

High voltage electrical power is supplied to the field windings 30 and 31 of the reversible motor mechanism by means of line wires 110 and 111. One end of field winding 30 is connected to contact 38 by means of a wire 112 and one end of field winding 31 is connected to contact 39 by means of a wire 113. The junction of field windings 30 and 31 is connected to the line wire 111 by a wire 114 and the relay switch arm 32 is connected to the line wire 110 by a wire 115. It will be apparent that whenever the relay switch arm 37 engages the contact 38, the field winding 30 will be energized by a circuit as follows: Line wire 110, wire 115, relay switch arm 37, contact 38, wire 112, field winding 30 and wire 114 to line wire 111. Similarly, when the relay switch arm 37 engages the contact 39, the field winding 31 will be energized as follows: Line wire 110, wire 115, relay switch arm 37, contact 39, wire 113, field winding 31 and wire 114 to line wire 111.

Low voltage power is supplied to the relay windings 34 and 35, to the solenoid coils 40 and 41, and to the various resistances associated with the solenoid coils 40 and 41 by means of a step-down transformer having a primary 116, that is connected to the line wires 110 and 111, and a low voltage secondary 117. The relay windings 34 and 35, in series, are connected across this secondary 117 by wires 118, 119 and 120. Similarly, the solenoid coils 40 and 41, in series, are connected across this secondary 117 by means of wires 121, 122 and 120. The control resistance 84 and the balancing resistance 90, in parallel, are connected in parallel with the series connected solenoid coils 40 and 41, through protective resistances 123 and 124, by wires 125, 126, 127 and 128 and by wires 129, 130, 131, 132 and 133. The junction of solenoid coils 40 and 41, the manual control arm 85, and the balancing contact finger 91 are all interconnected by means of wires 134, 135, 136 and 137. The switch arm 86 is connected to the junction of wires 135 and 136 so that this switch arm is also connected to the junction of solenoid coils 40 and 41. The cooperating switch arm 87 is connected to the switch arm 64 of relay mechanism 60 by a wire 138. The contact 68 of the relay mechanism 60, which cooperates with the switch arm 64 when the relay coil 61 is deenergized, is connected to one end of resistance 82 by a wire 139 and the manual contact arm 93, which cooperates with the resistance 82, is connected to the junction of wires 129 and 130 by a wire 140. The contact 67, which also cooperates with the switch arm 64, is connected to the right hand end of manual control resistance 84 by a wire 141. The junction of the relay windings 34 and 35 is connected to the switch arm 43, through a protective resistance 142. by means of a wire 143. The contact 44 is connected to a small number of turns of the solenoid coil 40 by a wire 144 and the contact 45 is similarly connected to a smalle number of turns of the solenoid coil 41 by a wire 145.

In the control of large buildings, it is often desired to break the building up into sections or zones according to varying exposures and to separately control such zones. The present invention is applicable to such an arrangement and a second zone of the building to which the rooms or spaces 10 and 11 are a part is diagrammatically indicated as comprising a room or space 150 that is provided with a suitable heat exchanger, in the form of a radiator 151. In order to facilitate the description and drawing and in order to show the relation between the control system for the zone already described and the second zone, various relays and other parts shown in dotted lines in connection with the first zone are not shown in detail in the second zone and all corresponding parts and interconnected wiring will be indicated by primed numbers.

The steam main 14 supplies steam to the radiator 151 through a valve 15' that is provided with a valve stem 22' to which is secured a rack 23'. This valve 15' is operated by a motor mechanism 24' that includes a main operating shaft 25' to which a pinion 26' is secured. The pinion 26' cooperates with the rack 23'. The steam, after passing through the valve 15', passes to a riser 16' which, in turn, supplies the radiator 151 and the rest of the radiators in this second zone. Radiator 151 is connected to the riser 16' by a pipe 152 and through a manual control valve 153. Preferably, a limiting orifice 21' is provided between the manually operable valve 153 and the radiator 151.

The motor mechanism 24' is controlled or operated by a relay mechanism 33' which corresponds exactly to the relay mechanism 33, the motor mechanism 25', of course, corresponding exactly to the motor mechanism 24. Conductors 112', 113' and 114' interconnect the motor mechanism 24' and the relay mechanism 33'. The relay mechanism 33' is controlled primarily by a controller 48' through a relay mechanism 60'. Power for operating the relay mechanism 60' from the controller 48' is supplied by a step-down transformer having a high voltage primary 69' and a low voltage secondary 70'. One side of this secondary 70' is connected to the controller 48' by a wire 71' and the other side of this secondary 70' is connected to the relay mechanism 60' by a wire 73'. Also, wires 72' and 74' interconnect the controller 48' and relay mechanism 60' whereby the thermostatic mechanism of the controller 48' controls the relay mechanism 60'. The controller 48' is also provided with a heater similar to the manner in which the controller 48 is provided with a heater, and wires 78' and 79' leading from the relay mechanism 60', supply the power to such heater, a rheostat 80' being provided for adjustment purposes. The relay mechanism 33' may also be controlled by a manual potentiometer comprising a resistance 84' and a cooperating contact arm 85' which, when it is moved to a position in which it does not engage the manual resistance 84', operates to close a switch comprised by switch arms 86' and 87'. A manually operable resistance or rheostat comprising a resistance 82' and a cooperating contact arm 83' is operative to vary the control of the controller 48' upon the relay 33'. The remaining circuit connections between the motor mechanism 24', the relay mechanism 33', the relay mechanism 60', and the various manual controllers and automatic switch will not be pointed out in detail but have all been provided with primed reference characters corresponding to those for the first zone and an inspection of the drawing will show that these connections correspond throughout.

*Operations*

First referring only to the detailed showing of the control system for the first zone comprising rooms or spaces 10 and 11, as previously pointed out, the valve 15 is fully closed. Under these conditions, the projection 99 of cam 98 is engaging switch arm 95 and has moved the same into engagement with switch arm 94 whereby to energize the signal light 92 which thereby indicates that the valve 15 is completely closed. The system is on automatic operation since the switch comprised by swtich arms 86 and 87 is closed. Under these conditions, the control contact arm 85 is disengaged from the resistance 84 so that this resistance is ineffective to vary the respective energizations of solenoid coils 40 and 41. Also, the rheostat 81 is so adjusted that none of its resistance is included in the circuit.

The solenoid coil 41 is substantially short-circuited by a shunt circuit which is as follows: From the junction of solenoid coils 40 and 41, wire 134, wire 135, switch arm 86, switch arm 87, wire 138, switch arm 64, contact 68, wire 139, contact arm 83, wire 140, wire 130, wire 132, protective resistance 124 and wire 133 to the other end of solenoid coil 41. Complete short circuiting, it will be seen, is prevented by the inclusion of the protective resistance 124. This serves to provide a small flow of current through the solenoid coil 41 so that it is operable to have some effect upon the plunger 42. The solenoid coil 40 is also substantially short-circuited with the parts in the position shown, by a circuit which is as follows: From the junction of solenoid coils 40 and 41, wire 134, wire 137, balancing contact finger 91, wire 126, wire 127, protective resistance 123 and wire 128 to the other end of solenoid coil 40. Complete short-circuiting of solenoid coil 40 is similarly prevented by the protective resistance 123. As a result, the solenoid coils 40 and 41 are equally energized although this energization is quite small. However, these energizations are sufficiently great to control the plunger 42 and, since the solenoid coils 40 and 41 are equally energized, the plunger 42 is in the central position shown wherein switch arm 43 is intermediate contacts 44 and 45 and is disengaged from both of them. Under these conditions, the relay windings 34 and 35, in series, are connected directly across the secondary 117 and are equally energized so that the plunger 36 is centrally positioned. Therefore, the relay switch arm 37 is intermediate contacts 38 and 39 and is disengaged from both of them so that both the field windings 30 and 31 are deenergized. The main operating shaft 25 of the motor mechanism 24 is therefore stationary. The relay coil 61 of relay mechanism 60 is deenergized so that no heat is being supplied to the heater 59 of the controller 48. Under these conditions, the temperature to which bimetallic element 52 of the controller 48 responds will be falling or will soon commence to fall.

When the temperature to which bimetallic element 52 responds has lowered to 68° F., relay coil 61 will be energized by the circuit hereinabove set forth, whereupon the primary 76 of the transformer contained in the relay mechanism 60 will be energized and electrical power will be supplied to the heater 59 in an amount determined by the setting of rheostat 80. Also, the switch arm 64 will be moved from engagement with contact 68 and will be moved into engagement with contact 67. Disengagement of switch arm 64 from contact 68 interrupts the shunt circuit by which the solenoid coil 41 has formerly been substantially short-circuited so that the current flow through the solenoid coil 41 is greatly increased. At the same time, movement of switch arm 64 into engagement with contact 67 establishes a new shunt circuit for solenoid coil 40 which substantially short-circuits the same irrespective of the position of the balancing contact finger 91 upon the balancing resistance 90. This new shunt circuit for the solenoid coil 40 is as follows: From the junction of solenoid coils 40 and 41, wire 134, wire 135, switch arm 86, switch arm 87, wire 138, switch arm 64, contact 67, wire 141, wire 125, wire 127, protective resistance 123 and wire 128 to the other side of the solenoid coil 40. Solenoid coil 41 is now much more highly energized than the solenoid coil 40 whereupon plunger 42 moves to the left and brings switch arm 43 into engagement with contact 45. Engagement of switch arm 43 with contact 45 connects the protective resistance 142 and the small number of turns of the solenoid coil 41, in series, in parallel with the relay winding 35. Starting with the secondary 117 and wire 118, it will be seen that the current flows from secondary 117 through relay winding 34 whereupon the circuit branches, part of the current going by way of relay winding 35 and wire 119 to wire 120 and the other side of secondary 117 whereas the other part goes by way of protective resistance 142, wire 143, switch arm 43, contact arm 45, wire 145, the small number of turns of the solenoid coil 41 and wire 122 to wire 120 and this same side of the secondary 117. This flow of current through the small number of turns of the solenoid coil 41 slightly increases the energization of a portion thereof whereupon the plunger 42 tends to move further toward the left. This tendency increases the contact pressure between switch arm 43 and contact 45. It will be noted that the complete flow of current for the relay winding 35 and the protective resistance 142 and the small number of turns of the solenoid coil 41 traverses the relay winding 34. The relay winding 34 is therefore more highly energized than relay winding 35 so plunger 36 moves to the right and brings relay switch arm 37 into engagement with contact 38. Field winding 30 is thereupon energized by the circuit set forth herein above.

Main operating shaft 25 will now be rotated in a clockwise direction as viewed from the left. Initial rotation of main operating shaft 25 in clockwise direction removes projection 99 from engagement with the switch arm 95 whereupon switch arm 95 disengages switch arm 94 and the signal light 92, which indicates that the valve is completely closed, is deenergized. This clockwise rotation of main operating shaft 25 causes the rack 23 of valve 15 to be lifted so that the valve 15 is moved towards open position. This clockwise rotation of main operating shaft 25 also causes balancing contact finger 91 to move along balancing resistance 90 towards the upper end thereof. When the main operating shaft 25 has thus moved through substantially 180 angular degrees in clockwise direction, the valve 15 will have been fully opened, the projection 99 of the cam 98 will have engaged switch arm 97 and moved the same into engagement with switch arm 96 and the balancing contact finger 91 will have been moved to a position in which it contacts the wire 131, having been moved all the way across balancing resistance 90. Engagement of switch arm 97 with switch arm 96 energizes the signal light 93 to indicate that the valve has been fully opened as heretofore explained. Engagement of balancing contact finger 91 with the wire 131 establishes a shunt circuit for the solenoid coil 41 that substantially short-circuits the same. This new shunt circuit is as follows: From the junction of solenoid windings 40 and 41, wire 134, wire 137, balancing contact finger 91, wire 131, wire 132, protective resistance 124 and wire 133 to the left hand end of solenoid coil 41. The energizations of solenoid coils 40 and 41 are thereupon again equalized and the plunger 42 returns towards its central position and moves switch arm 43 from engagement with contact 45. This interrupts the circuit through protective resistance 142 and the small number of turns of the solenoid coil 41 whereupon the relay windings 34 and 35 are again equally energized and the extra leftward pull exerted by the small number of turns of the solenoid coil 41 upon the plunger 42 is removed. As a result, the plunger 36 returns to its central position which brings relay switch arm 37 intermediate contacts 38 and 39 and the plunger 42 moves a little further towards the right and assumes its complete central position wherein the switch arm 43 is relatively widely spaced from contact 45 as well as from the contact 44. The field winding 30 is now deenergized and further rotation of main operating shaft 25 ceases.

Energization of the heater 59 supplies heat to the block 49 and therefore tends to raise the temperature to which bimetallic element 52 responds, and opening of valve 15 supplies steam to the radiators 12 and 13 located in the rooms or spaces 10 and 11 so as to raise the temperature in these rooms or spaces. Because of the manner in which controller 48 is adjusted in respect to the rooms or spaces 10 and 11 through the rheostat 80, the temperature of the controller will be raised to 70° F., or thereabove, so as to deenergize relay windings 61 of the relay mechanism 60, only after the temperature of the spaces 10 and 11, or the average temperature thereof, has been raised to the desired degree. When this occurs, relay switch arm 64 will disengage contact 67 and return to the position shown in the drawing where it is engaged with contact 68. The shunt circuit for solenoid coil 40 is now removed and the original shunt circuit for solenoid coil 41 is reestablished. The original shunt circuit for solenoid coil 40 however is not present since the balancing contact finger 91 is now engaging the wire 131 so that the whole balancing resistance 90, as well as the protective resistance 123, is connected in parallel relationship to the solenoid coil 40. As a result, the solenoid coil 40 is more highly energized than the solenoid coil 41 whereupon the plunger 42 moves to the right and switch arm 43 engages the contact 44. Engagement of switch arm 43 with contact 44 places the protective resistance 142 and a small number of turns of the solenoid coil 40, in series, in parallel with the relay winding 34, whereupon the full flow of current traversing the relay winding 35 is split up and part thereof traverses the relay winding 34 whereas the remainder traverses the protective resistance 142 and the small number of turns of the solenoid 40 by a circuit which will now be apparent. This current flow through the small number of turns of the solenoid coil 40 produces an additional attractive force on the plunger 42 attempting to move the same further to the right whereby the switch arm 43 is brought more firmly into engagement with the contact 44. The unbalancing of the energizations of the relay windings 34 and 35 with the relay winding 35 receiving more current than the relay winding 34, causes movement of plunger 36 to the left and brings relay switch arm 37 into engagement with contact 39. Field winding 31 is therefore energized by the previously described circuit and, the main operating shaft 25 is rotated in a counter-clockwise direction as viewed from the left.

Initial counter-clockwise rotation of main operating shaft 25 moves the projection 99 of cam 98 from engagement with the switch arm 97 whereupon the switch arm 97 disengages switch arm 96 and the energizing circuit for the signal light 93 is interrupted, thereby showing that the valve is no longer completely opened. This counter-clockwise rotation of main operating shaft 25 also causes a downward movement of the rack 23 and a corresponding closing movement of the valve 15 and, in addition, causes the balancing contact finger 91 to traverse the balancing resistance 90 and move towards the lower end which is connected to the wire 126. This counter-clockwise rotation of the main operating shaft 25 will continue until the parts are returned to the positions shown in the drawing wherein the balancing contact finger 91 engages the wire 126. The original shunt circuit is thus reestablished for the solenoid coil 40. The energizations of solenoid coils 40 and 41 are therefore again substantially equalized and the plunger 42 moves to the left sufficiently to disengage contact arm 43 from contact 44. Immediately this happens, the circuit through the small number of turns of the solenoid coil 40 is interrupted whereupon the plunger 42 assumes its exact central position as does the switch arm 43. The relay windings 34 and 35 are now again equally energized so that plunger 36 returns to its central position and relay switch arm 37 returns to its position intermediate the contacts 38 and 39. The field winding 31 is therefore deenergized and further counter-clockwise rotation of main operating shaft ceases. The valve 15 is now fully closed and energy is no longer being supplied to the heater 59 of the controller 48.

Since heat is no longer being supplied either to the controller 48 or to the rooms or spaces 10 and 11, the temperature of the controller 48 as well as of the rooms or spaces 10 and 11 soon begins to fall. When the temperature of controller 48 has lowered sufficiently, the operations described above will be repeated. In this manner, the controller 48 operates to maintain its temperature within predetermined limits and, in so doing, completely opens and closes the valve 15 whereby the temperature or the rooms or spaces 10 and 11, or the average temperture thereof, is also maintained within predetermined limits since the heat losses from such rooms or spaces and from the controller 48 have been correlated.

As previously indicated, under certain conditions, it may be desirable to maintain a small flow of steam to the radiators 12 and 13 at all times. Such conditions arise particularly during colder weather and the amount of this minimum flow of steam depends upon the severeness of the outside weather conditions. When it is thus desired to supply a continuous minimum flow of steam to the radiators 12 and 13, manually operated contact arm 83 is positioned upon the resistance 82 so as to include a desired amount of such resistance 82 in circuit with the wires 139 and 140. As a result, when the switch arm 64 engages contact 68, short circuiting of the solenoid coil 41 will not be as complete as heretofore explained since this shunt circuit will not only include protective resistance 124 but will also include part of the resistance 82. Therefore, the energizations of solenoid coils 40 and 41 will only be balanced when the balancing contactor 91 engages the balancing resistance 90 at some point removed from its connection with wire 126. The point at which the balancing contact finger 91 must engage the balancing resistance 90 to bring about this balancing of the energizations of solenoid coils 40 and 41, depends upon the amount of resistance 82 included in the circuit between wires 139 and 140. As a result, the valve 15 will not fully close. In this manner, the valve 15 may be caused to be operated between some minimum open position and full open position under the control of controller 48 and will never move to full closed position. The amount of this minimum opening can be determined by varying the setting of manual contact arm 83 on manual resistance 82.

If it should be desired to operate the valve 15 manually to the exclusion of the controller 48 as well as to the exclusion of the rheostat 81, the manual contact arm 85 is moved into engagement with the resistance 84. Such movement of the manual contact arm 85 permits opening of the switch comprised by switch arms 86 and 87 whereupon the switch arm 64 of the relay mechanism 60 is disconnected from the junction of solenoid coils 40 and 41 and from the balancing contact finger 91. As a result, the controller 48 can no longer have any effect upon the respective energizations of the solenoid coils 40 and 41. The motor mechanism 24 will now be controlled entirely by the manually controlled potentiometer comprised by the manual resistance 84 and the cooperating contact arm 85 and the main operating shaft 25 will be moved to positions corresponding exactly to the position of manual contact arm 85 upon the manual resistance 84 in a manner that is well known in the art and which is shown in detail as well as described in detail in the copending application of Lewis L. Cunningham, Serial No. 673,236, filed May 24, 1933.

The second zone of the building being controlled, in other words the room or space 150, is controlled in the same manner as described in connection with the first zone. The controller 48' normally controls the valve 15' to move it from full open to full closed positions and vice versa in accordance with the temperature conditions prevailing within the controller 48'. By manual manipulation of the rheostat 81', the range of movement of the valve 15' can be changed so that this valve moves from full open position to some minimum open position and vice versa and never moves to full closed position. Also, if it is desired to operate the valve 15' manually, the manually operable contact arm 85' is positioned upon the manual resistance 84' in accordance with the position it is desired to have the valve 15' assume. Such manual manipulation allows the switch comprised by switch arms 86' and 87' to open so that the controller 48' and rheostat 81' can have no further effect upon the position of the valve 15'.

From the foregoing description, it will be evident that I have provided a system in which a valve or other flow controlling element is normally automatically moved either to its full open position or maximum flow position or to its full closed position or no-flow position. I have also provided means whereby the range of movement of the valve or flow controlling element may be varied and specifically whereby the valve or flow controlling element cannot be moved to full closed or no-flow position. Further, I have provided means by which the valve or flow controlling element may be positioned in any desired position irrespective of the action of the controller. It will be evident that numerous changes can be made in the details of the embodiment of the invention herein disclosed without departing from the spirit of the invention and I am therefore to be limited only by the scope of the appended claims.

I claim as my invention:

1. A temperature control system of the class described comprising, in combination, a flow controlling element in control of the flow of a temperature changing fluid, reversible motor means in control of the flow controlling element, double circuit switching mechanism in control of said reversible motor means, a pair of normally equally energized oppositely acting electrical devices in control of said switching mechanism, a pair of switches selectively operable to change the current flow through one or the other of said devices whereby said switching mechanism is operated to operatively energize said reversible motor means for movement in one direction or the other to position said element, first resistance means operated by said motor means and arranged to rebalance the energizations of said devices only when said element has been moved to one or the other of its extreme positions, and a variable resistance means associated with one of said switches and one of said devices and operable to vary the change in current flow through said device produced by said switch whereby the energizations of said devices are rebalanced by said first resistance means before said motor means has moved the flow controlling element to its corresponding extreme position.

2. In a heating system for a building, in combination, a plurality of radiators, a steam supply main for supplying steam to said radiators, a valve in said main for controlling the flow of steam to said radiators, a motor for actuating said valve, a controller connected to said motor, means for actuating said controller in a manner to alternately open said valve to a predetermined position and to substantially close it, for thereby supplying steam to the system for certain periods while substantially interrupting the supply of steam for other periods, and control means located remotely of said motor and said controller and interposed in the connections between said motor and said controller for determining the limit of movement of said motor in valve closing direction.

3. In a heating system for a building, in combination, a plurality of radiators, a steam supply main for supplying steam to said radiators, a valve in said main for controlling the flow of steam, a motor for actuating said valve, thermostatic means responsive to the demand for heat for controlling said motor, said thermostatic means being of the non graduating type and acting to alternately open said valve to a predetermined position for certain periods while substantially closing it for other periods, the length of the periods being varied in accordance with the demand for heat for thereby maintaining the building at constant temperature, and control means located remotely of said thermostatic means and said motor and interposed in the connections between said thermostatic means and said motor for limiting the movement of said motor in valve closing direction under the control of said thermostatic means.

4. In a heating system for a building, in combination, a plurality of radiators, a steam supply main for supplying steam to said radiators, a valve in said main for controlling the flow of steam to said radiators, a reversible motor means for operating said valve, switching means operable when moved to a first position to energize said motor means for opening said valve to a predetermined position and when actuated to a second position to energize said motor means for movement in the opposite direction, means for operating said switching means between said first and second positions for thereby alternately opening and closing said valve, and means including means operated by said motor means for preventing complete closing of said valve under the control of said switching means.

5. In a heating system for a building, in combination, a plurality of radiators, a steam supply main for supplying steam to said radiators, a valve in said main for controlling the flow of steam to said radiators, a reversible electric motor means for operating said valve, switching means operable when moved to a first position to energize said motor means for opening said valve to a predetermined position and when actuated to a second position to energize said motor means for movement in the opposite direction, means for operating said switching means between said first and second positions for thereby alternately opening and closing said valve, minimum flow means interposed between said switching means and said motor means for preventing complete closing of said valve under the control of said switching means, said minimum flow means including electrical adjusting means operable from a remote point.

6. In a heating system for a building, in combination, a plurality of radiators, a steam supply main for supplying steam to said radiators, a valve in said main for controlling the flow of steam to said radiators, a reversible electric motor means for operating said valve, switching means operable when moved to a first position to energize said motor means for opening said valve to a predetermined position and when actuated to a second position to energize said motor means for movement in the opposite direction, thermostatic means responsive to the heat demand for said building for operating said switching means from said first position to said second position and vice versa for thereby alternately supplying and interrupting the supply of steam, the duration of the periods of supply being varied in accordance with the demand for heat, and means including means operated by said motor means for preventing complete closing of said valve under the control of said switching means.

7. In a heating system for a building, in combination, a plurality of radiators, a steam supply main for supplying steam to said radiators, a valve in said main for controlling the flow of steam to said radiators, a reversible electric motor means for operating said valve, switching means operable when moved to a first position to energize said motor means for opening said valve to a predetermined position and when actuated to a second position to energize said motor means for movement in the opposite direction, thermostatic means responsive to the heat demand for said building for operating said switching means from said first position to said second position and vice versa for thereby alternately supplying and interrupting the supply of steam, the duration of the periods of supply being varied in accordance with the demand for heat, minimum flow means interposed between said switching means and said motor means for preventing complete closing of said valve under the control of said switching means, said minimum flow means including electrical adjusting means operable from a remote point.

8. In a temperature control system, in combination, a heat exchanger in contact with air in a space to be conditioned, piping means for supplying heat exchange fluid to said heat exchanger, a valve in control of the flow of heat exchange fluid, a motor for actuating said valve, thermostatic means influenced by the demand for temperature changing in said space for controlling said motor, said thermostatic means being of the non-graduating type and acting to operate said motor either to open said valve to a predetermined limit or to close said valve to a predetermined limit, manual means for adjusting said thermostatic means for determining the limit of movement of said valve towards closed position, and other manual means connected between said thermostatic means and said motor for disconnecting said thermostatic means from said motor and for graduatingly controlling said motor from a remote point.

9. In a heating system for a building, in combination, a plurality of radiators, a steam supply main for supplying steam to said radiators, a valve in said main for controlling the flow of steam, a motor for actuating said valve, thermostatic means responsive to the demand for heat for controlling said motor, said thermostatic means being of the non-graduating type and acting to alternately open said valve to a predetermined position for certain periods while substantially closing it for other periods, the length of the periods being varied in accordance with the demand for heat thereby maintaining the building at constant temperature, manual means for adjusting said thermostatic means for determining the limit of movement of said valve towards closed position, and other manual means connected between said thermostatic means and said motor for disconnecting said thermostatic means from said motor and for graduatingly controlling said motor from a remote point.

10. In a steam heating system, in combination, a valve in control of the flow of steam to a plurality of radiators, electric motor means having a normal range of movement, mechanical connections between said motor means and said valve such that the motor means in moving throughout its full normal range of movement moves said valve from open to closed position, a temperature responsive switching mechanism in control of said motor means selectively operable upon change in temperature to drive said motor means to one end or the other of its normal range of movement to either completely open or completely close said valve, and other electrical means associated with said motor means and said switching means selectively operable to stop driving of the motor means by the switching means when the valve has reached a partially closed position whereby a minimum flow of steam to said radiator may be maintained at all times irrespective of changes in temperature at said temperature responsive switching mechanism.

11. In a steam heating system, in combination, a valve in control of the flow of steam to a plurality of radiators, electric motor means having a normal range of movement, mechanical connections between said motor means and said valve such that the motor means in moving throughout its full normal range of movement moves said valve from open to closed position, a temperature responsive switching mechanism in control of said motor means selectively operable upon change in temperature to drive said motor means to one end or the other of its normal range of movement to either completely open or completely close said valve, other electrical means associated with said motor means and said switching means selectively operable to stop driving of the motor means by the switching means when the valve has reached a partially closed position whereby a minimum flow of steam to said radiator may be maintained at all times irrespective of changes in temperature at said temperature responsive switching mechanism, and electrical means operable from a remote point for adjusting said other electrical means.

12. In a system of the class described, in combination, a flow controller operable from a position of maximum flow to a position of minimum flow, a reversible motor for positioning said flow controller and operable to move said flow controller through its normal range of movement, a non-graduating control device having a control member which remains stationary in only two positions, connections between said control device and said motor for causing said control device to operate said motor from one position to another, and means interposed in the connections between said device and said motor for preventing said motor from operating said flow controller through its entire range of movement.

13. In a system of the class described, in combination, a flow controller operable from a position of maximum flow to a position of minimum flow, a reversible motor for positioning said flow controller and operable to move said flow controller through its normal range of movement, a non-graduating control device having a control member which remains stationary in only two positions, connections between said control device and said motor for causing said control device to operate said motor from one position to another, means interposed in the connections between said device and said motor for preventing said motor from operating said flow controller through its entire range of movement, said last mentioned means including adjusting means remote of said motor.

14. In a system of the class described, in combination, a device to be controlled and having a predetermined maximum range of movement, a reversible electric motor means operable to move said device throughout said range of movement, reversing switching mechanism for controlling the energization of said motor means, said reversing switching mechanism being of the non-graduating type which remains stationary in only two positions, control circuits controlled by said switching mechanism for controlling said motor means for energizing said motor means to operate in one direction when the switching mechanism is in one of its positions and for energizing said motor means to operate in the opposite direction when the switching mechanism is in the other of its positions, limit switches associated with said control circuits for stopping the motor means when said device is moved to one end or the other of its predetermined range of movement, and limiting means connected into said control circuit for preventing movement of said device by said motor means under the control of said switching mechanism beyond a position which is within the range of movement of said device.

15. In a system of the class described, in combination, a device to be controlled and having a predetermined maximum range of movement, a reversible electric motor means operable to move said device throughout said range of movement, reversing switching mechanism for controlling the energization of said motor means, said reversing switching mechanism being of the non-graduating type which remains stationary in only two positions, control circuits controlled by said switching mechanism for controlling said motor means for energizing said motor means to operate in one direction when the switching mechanism is in one of its positions and for energizing said motor means to operate in the opposite direction when the switching mechanism is in the other of its positions, limit switches associated with said control circuits for stopping the motor means when said device is moved to one end or the other of its predetermined range of movement, limiting means connected into said control circuit for preventing movement of said device by said motor means under the control of said switching mechanism beyond a position which is within the range of movement of said device, said limiting means including electrical adjusting means operable from a remote point.

16. In a system of the class described, in combination, a device to be controlled and having a predetermined maximum range of movement, a reversible motor means operable to move said device throughout said range of movement, a balancing relay operable to cause movement of said motor in either direction or to remain stationary, follow-up means controlled by said motor means for controlling said balancing relay, reversing switching mechanism connected to said balancing relay, said reversing switching mechanism being of the non-graduating type which remains stationary in only two positions, said switching mechanism being connected so as to unbalance said relay in one direction when the switching mechanism is in one of its positions, while unbalancing said relay in the opposite direction when said switching mechanism is in the other of its positions, and resistance means connected between said switching mechanism and said balancing relay for preventing complete unbalancing of said relay in one direction by said switching mechanism for thereby preventing said switching mechanism from causing movement of said device to one limit of its travel.

JNO. T. MIDYETTE, Jr.